UNITED STATES PATENT OFFICE 2,516,956

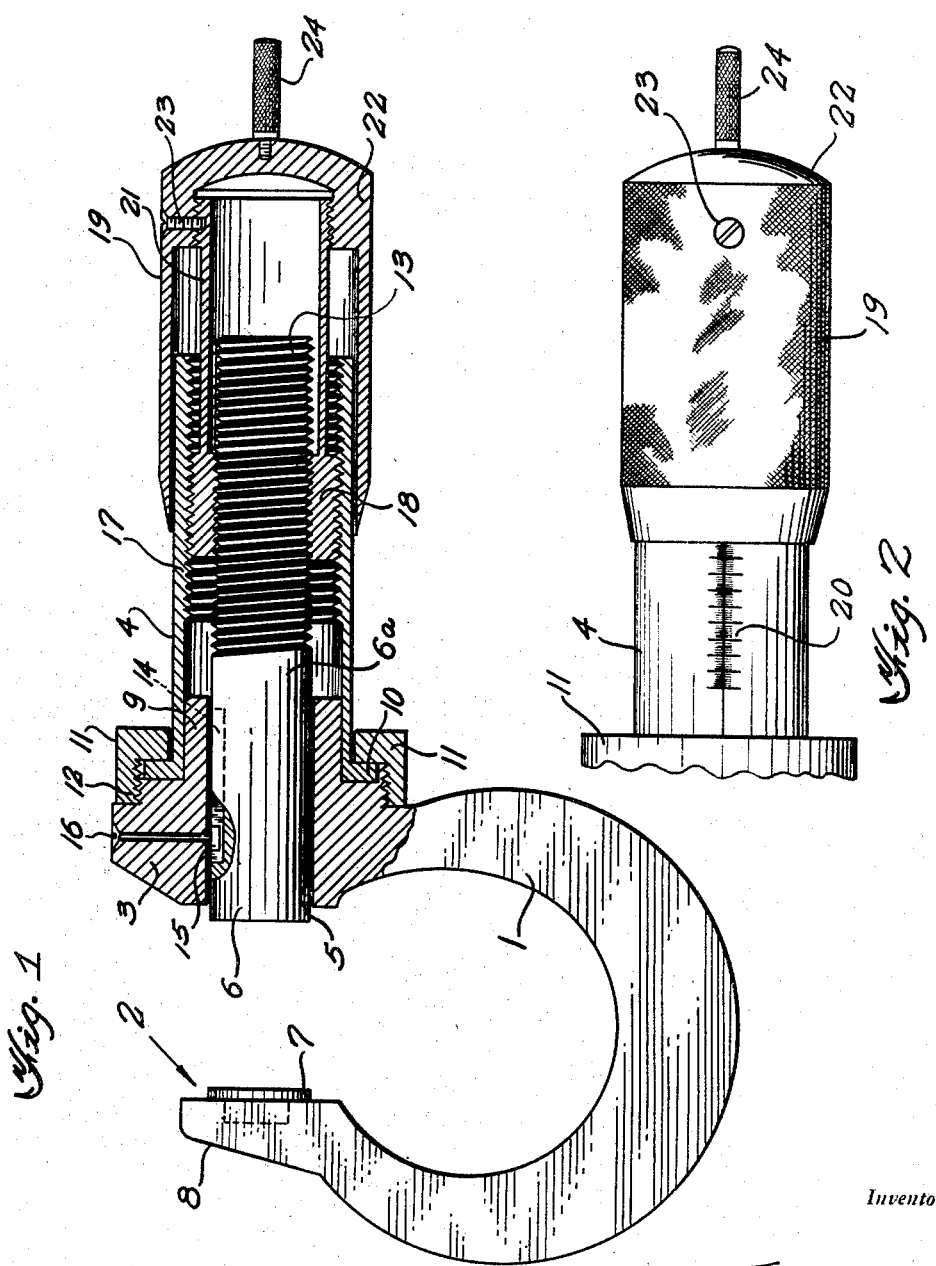

MICROMETER

Simon J. Carlton, Vallejo, Calif.

Application December 28, 1945, Serial No. 637,555

1 Claim. (Cl. 33—164)

This invention relates to micrometer gauges and it has for its objects to provide a gauge of the type specified which permits to obtain a greater degree of accuracy than known gauges with the same spacing of the graduation marks and the same number of threads per inch on the threaded portions of the micrometer.

This result is obtained by means of a sleeve attached to the thimble of the micrometer which is provided with two threaded portions, one screw thread being preferably arranged internally while the other is arranged externally. These two threads differ as regards the number of threads per length unit. One of the threaded portions, preferably the portion with the internal threads, engages the sliding post of the gauge, while the other threaded portion engages the graduation scale which is connected with the other or fixed post. The movement of the sliding post towards the fixed post merely amounts to the difference between the movements produced by the two threaded portions during rotation of the thimble. A greater precision is therefore obtained, as the graduation marks with the same spacing of the threads may be spaced farther apart or the threads may be farther apart for the same spacing of the graduation marks. In practice this amounts to a higher degree of precision of the instrument as the threads are spaced as finely as existing mechanical means will permit to make them, while the graduation marks on account of the enlarged distance may be more finely subdivided.

The invention is illustrated in the accompanying drawings showing one embodiment thereof. It is to be understood, however, that this modification is intended merely to show by way of example a practical design for a micrometer gauge when the invention has been applied to it. Other modifications and designs embodying the same improvement will be obvious to the expert skilled in the art, as they are foreshadowed in the following specification. These modifications which are included in the annexed claims are not a departure from but a part of the invention.

In the accompanying drawings:

Figure 1 is an elevational sectional view of one modification of the invention, and Figure 2 is a plan view of the rear part of the gauge.

The micrometric gauge according to the invention consists of the bail member 1 carrying one of the measuring posts, generally indicated by 2, of the gauge and of the frame member 3 to which the graduated sleeve 4 is secured. The frame member has a central bore 5 through which the sliding post 6 passes, whose front face forms one of the surfaces applied against the object to be gauged. The other surface is formed by a hardened steel disk 7 which is fixed to the projection 8 of the bail 1.

The frame member 3 may be integral with the graduated sleeve 4, or the latter may be directly screwed on the former, both methods being customary. However, it is preferred to depart from these known designs and to provide the frame member 3 with a sleeve-like projection 9 over which the graduated sleeve 4 may be slid. The latter may be provided with a flange 10 which is firmly clamped against the body of the frame by means of an inwardly flanged nut 11 screwed on a threaded portion 12 of the frame 3.

It will be observed that the graduated sleeve 4 surrounds the sliding post 6 but is spaced from it to the extent corresponding to the thickness of the projecting portion 9 of the frame. This graduated sleeve on its outer surface is provided with the graduation scale 20 by means of which the micrometer reading is taken; it is internally threaded as shown at 17.

The sliding post 6 is provided with a smooth portion 6a passing through the bore 5 of the frame and with a threaded portion 13. It is held against rotation by a key 14. The latter, which permits sliding, may be provided with a slot 15 into which a stop 16 fixed on the frame may enter.

The threaded portion 13 engages the differential sleeve 18 which is carried by thimble 19 of the gauge. Said sleeve is threaded on the inside and outside, the internal thread engaging the threaded portion 13 of the sliding post as above stated. The external thread engages the internal thread 17 of the graduation sleeve.

The pitch of the two threads of the sleeve differs. The internal thread, for instance, engaging the sliding post, may be a standard fine right hand thread, while the external thread engaging the graduated sleeve may have less threads per length unit. It is thus obvious that a movement of the differential sleeve will cause movements both of the graduated sleeve and of the sliding post and that the movement of the latter with respect to the former will correspond to the difference between the threads.

The differential sleeve is arranged at the end of a supporting cylinder 21 whose end is screwed into the head 22 of the thimble 19. To obtain fixation against rotation a setscrew 23 may be used.

The thimble head 22 may be provided with the customary central friction head 24. The latter, if necessary, may be enlarged to facilitate the operation.

The gauge is operated in the customary manner. It will however, be manifest that when the thimble is rotated the sliding post 6 is advanced merely to an extent corresponding to the difference between the translatory movements imparted by the two threaded portions by virtue of the rotation. This will be clear if one of the members will be considered as a fixed member. If, for instance, the frame is regarded as the fixed member the rotation of the thimble will advance the differential sleeve and the thimble within the graduated sleeve (considered as the fixed member) towards the right, while the sliding post is advanced within the sleeve to the left. Clearly, merely the difference between the translating movements will manifest itself between the fixed and the sliding object measuring surfaces.

This difference, as will be clear, may be selected in accordance with the type of work for which the micrometric gauge is designed and is not dependent on the limits to which the cutting of fine threads are subject. It also admits graduation scales which are more easily readable by means of the edge of the thimble as one turn of the thimble may be made to cover any distance which is suitable and is no longer, as in known constructions, tied to the fineness of the thread which can be cut and to the minimum space necessary for every subdivision of the scale.

The invention may be carried into effect by a threaded differential element other than that shown and may be adapted to other types of micrometers without departure from its essence.

I claim:

A micrometric gauge comprising a bail member with an anvil and a frame member solidary therewith, said frame member being provided with a cylindrical opening and having an external screw threaded portion and a reduced cylindrical seating sleeve separated from the screw threaded portion by a radially stepped portion, a stop member carried by said frame member projecting into the cylindrical opening, a graduated sleeve member fitting over said cylindrical seating sleeve of the frame member, said sleeve member being provided with an outwardly projecting flange applied against the radially stepped portion of the frame, a nut member engaging the screw threaded portion of the frame and provided with an inwardly projecting flange which overlaps and grips the flange of the graduated sleeve member, the latter member being moreover provided with an external graduated scale and with a screw threaded portion on its inside, a sliding post sliding within the cylindrical opening of the said frame member and within the graduated sleeve member and provided on one end with a longitudinal groove engaging the stop member held by the frame member, and further provided with an externally threaded portion, a differential member provided with two threaded portions, one portion engaging the internal threads of the graduated sleeve member and the other engaging the threaded portion of the sliding post, a thimble adapted to move said sliding post and cooperating with the graduated scale on the graduated sleeve member, and a connecting member between said differential member and said thimble for attaching the former to the latter.

SIMON J. CARLTON.

REFERENCES CITED

The following references are of record in the file of this patent:

UNITED STATES PATENTS

| Number | Name | Date |
| --- | --- | --- |
| 582,154 | Clapp | May 4, 1897 |
| 923,880 | Nielsen | June 8, 1909 |
| 1,311,548 | Blush | July 29, 1919 |
| 1,533,787 | Crescio | Apr. 14, 1925 |
| 2,099,896 | Kinzel | Nov. 23, 1937 |

FOREIGN PATENTS

| Number | Country | Date |
| --- | --- | --- |
| 8,798 | Great Britain | 1906 |